United States Patent
Anderson et al.

(10) Patent No.: US 8,909,901 B2
(45) Date of Patent: Dec. 9, 2014

(54) PERMUTE OPERATIONS WITH FLEXIBLE ZERO CONTROL

(75) Inventors: Cristina Anderson, Hillsboro, OR (US); Mark Buxton, Chandler, AZ (US); Doron Orenstien, Haifa (IL); Bob Valentine, Qiryat Tivon (IL)

(73) Assignee: Intel Corporation, Santa Clara, CA (US)

( * ) Notice: Subject to any disclaimer, the term of this patent is extended or adjusted under 35 U.S.C. 154(b) by 1117 days.

(21) Appl. No.: 12/005,770

(22) Filed: Dec. 28, 2007

(65) Prior Publication Data

US 2009/0172366 A1 Jul. 2, 2009

(51) Int. Cl.
*G06F 7/76* (2006.01)
*G06F 9/315* (2006.01)
*G06F 9/30* (2006.01)

(52) U.S. Cl.
CPC ........ *G06F 9/30032* (2013.01); *G06F 9/30145* (2013.01); *G06F 7/76* (2013.01); *G06F 9/30167* (2013.01); *G06F 9/30036* (2013.01)
USPC .............................................. 712/4; 712/300

(58) Field of Classification Search
CPC ....... G06F 7/76; G06F 7/764; G06F 9/30032; G06F 9/30036
USPC .................... 712/4, 5, 6, 7, 22, 224, 225, 300
See application file for complete search history.

(56) References Cited

U.S. PATENT DOCUMENTS

| | | | |
|---|---|---|---|
| 4,881,168 A | 11/1989 | Inagami et al. | |
| 5,511,210 A | 4/1996 | Nishikawa et al. | |
| 6,041,404 A | 3/2000 | Roussel et al. | 712/210 |
| 6,052,769 A | 4/2000 | Huff et al. | |
| 6,076,153 A | 6/2000 | Grochowski et al. | |
| 6,446,198 B1* | 9/2002 | Sazegari | 712/300 |
| 6,523,108 B1 | 2/2003 | James et al. | |
| 6,952,478 B2* | 10/2005 | Lee et al. | 380/37 |
| 7,155,601 B2 | 12/2006 | Chennupaty et al. | 712/300 |
| 7,464,255 B1* | 12/2008 | Tan et al. | 712/300 |
| 2002/0078011 A1* | 6/2002 | Lee et al. | 707/1 |
| 2004/0054879 A1* | 3/2004 | Macy et al. | 712/221 |
| 2005/0027969 A1 | 2/2005 | Simon et al. | |
| 2005/0125639 A1* | 6/2005 | Symes et al. | 712/225 |
| 2009/0100247 A1* | 4/2009 | Moyer et al. | 712/4 |
| 2009/0172348 A1 | 7/2009 | Cavin | |

OTHER PUBLICATIONS

AMD, AMD64 Technology, "PERMPD—Permute Double-Precision Floating-Point," Instruction Reference 43479—Rev. 3.01; Aug. 2007, pp. 119-126.
Apple Developer Connection, "Vector Permute," 2005, 1 page.
Apple Developer Connection, "Highlights and Examples," 2005, pp. 1-3.

(Continued)

*Primary Examiner* — David J Huisman
(74) *Attorney, Agent, or Firm* — Trop, Pruner & Hu, P.C.

(57) ABSTRACT

In one embodiment, the present invention includes logic to receive a permute instruction, first and second source operands, and control values, and to perform a permute operation based on an operation between at least two of the control values so that selected portions of the first and second source operands or a predetermined value can be stored into elements of a destination. Multiple permute instructions may be combined to perform efficient table lookups. Other embodiments are described and claimed.

21 Claims, 6 Drawing Sheets

(56) References Cited

OTHER PUBLICATIONS

U.S. Appl. No. 11/524,852, filed Sep. 20, 2006, entitled "Instruction and Logic for Performing a Dot-Product Operation," by Ronen Zohar, et al.

U.S. Patent and Trademark Office, Office Action issued Jul. 20, 2010 with Reply filed on Oct. 19, 2010 in U.S. Appl. No. 12/005,575, pp. 1-28.

U.S. Patent and Trademark Office, Final Office Action issued Dec. 27, 2010 with Request for Continued Examination filed on Mar. 28, 2011 in U.S. Appl. No. 12/005,575, pp. 1-35.

* cited by examiner ns. Not all instructions are created equal as some are quicker to complete while others can take an enormous number of clock cycles. The faster the throughput of instructions, the better the overall performance of the processor. However, there are certain instructions that have greater complexity and require more in terms of execution time and processor resources. For example, there are floating point instructions, data permute operations, data moves, etc.

PERMUTE OPERATIONS WITH FLEXIBLE ZERO CONTROL

BACKGROUND

As processor technology advances, newer software code is also being generated to run on machines with these processors. Users generally expect and demand higher performance from their computers regardless of the type of software being used. Issues can arise from the kinds of instructions and operations that are actually being performed within the processor. Certain types of operations require more time to complete based on the complexity of the operations and/or type of circuitry needed. This provides an opportunity to optimize the way certain complex operations are executed inside the processor.

Media applications are drivers of microprocessor development. Accordingly, the display of images and playback of audio and video data, which are collectively referred to as content, have become increasingly popular applications for current computing devices. Such operations are computationally intensive, but offer a high level of data parallelism that can be exploited through an efficient implementation using various data storage devices, such as single instruction multiple data (SIMD) registers. A number of current architectures also require multiple operations, instructions, or sub-instructions (often referred to as "micro-operations" or "µops") to perform various mathematical operations or data permutation operations on a number of operands, thereby diminishing throughput and increasing the number of clock cycles required to perform these operations.

A single instruction multiple data (SIMD) permute instruction is an existing data reorganization instruction on many architectures. Such instructions can be used to write data elements from one or more source locations into elements of a destination location. For example, vector registers that include multiple data elements can be the source and destination locations. By using such an instruction, one or more data elements from a source can be written into the destination. However, little or no flexibility exists to enable varied control of the selection mechanism or the ability to flexibly control zeroing of permuted fields.

DETAILED DESCRIPTION

Figure 1:
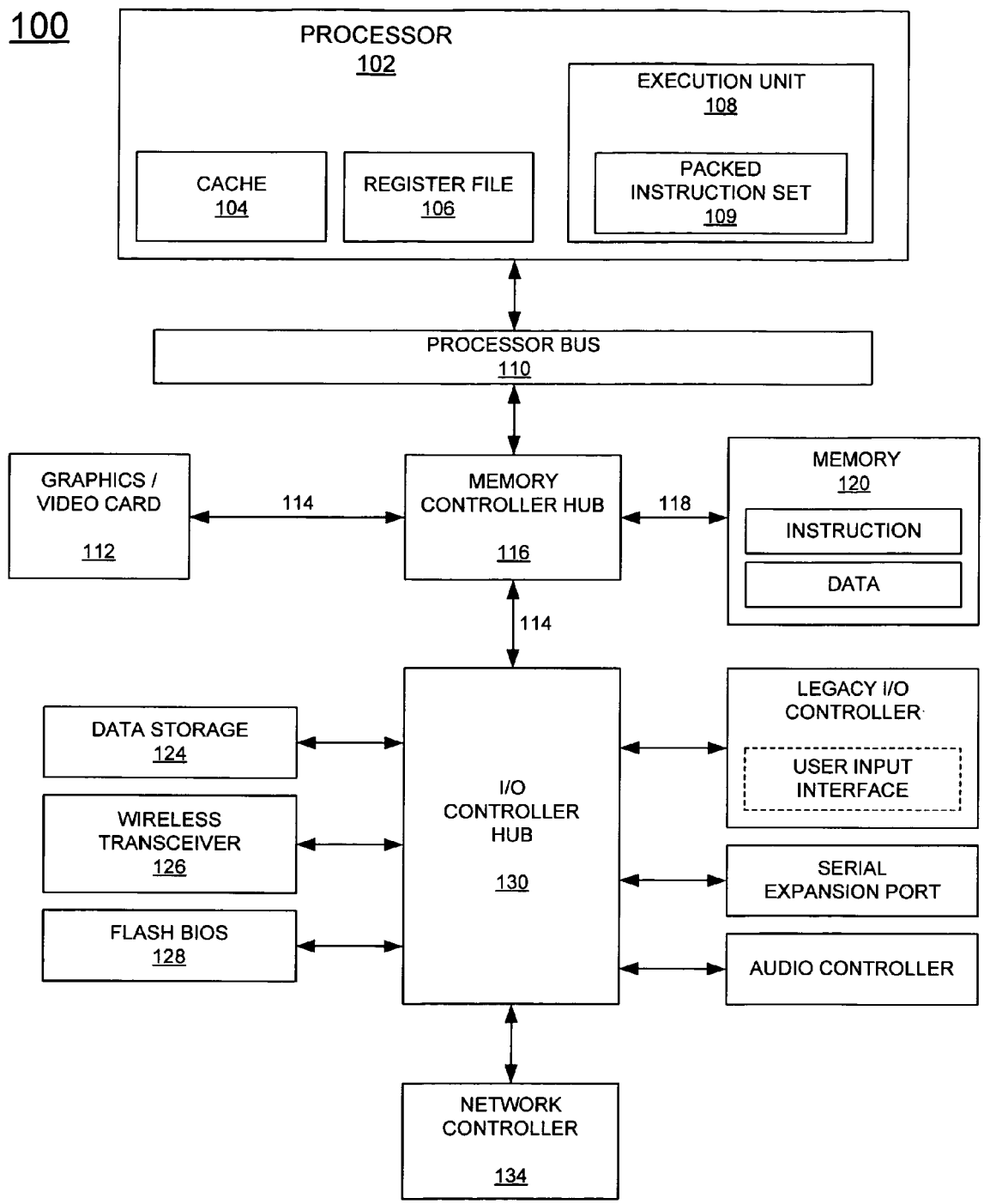
FIG. 1 is a block diagram of an exemplary computer system formed with a processor that includes logic to execute instructions for permute operations in accordance with one embodiment of the present invention.

In modern processors, a number of different execution units are used to process and execute a variety of code and instructions. Not all instructions are created equal as some are quicker to complete while others can take an enormous number of clock cycles. The faster the throughput of instructions, the better the overall performance of the processor. However, there are certain instructions that have greater complexity and require more in terms of execution time and processor resources. For example, there are floating point instructions, data permute operations, data moves, etc.

As more and more computer systems are used in internet and multimedia applications, additional processor support has been introduced over time. For instance, Single Instruction, Multiple Data (SIMD) integer/floating point instructions and Streaming SIMD Extensions (SSE) are instructions that reduce the overall number of instructions required to execute a particular program task, which in turn can reduce the power consumption. These instructions can speed up software performance by operating on multiple data elements in parallel. As a result, performance gains can be achieved in a wide range of applications including video, speech, and image/photo processing.

In various embodiments, individual instructions of an instruction set may be provided to enable data permute operations to perform more efficiently. More specifically, embodiments may provide multiple flavors of data permute instructions, each to enable packed SIMD data from one or more storage areas, such as a register or memory, to be permuted in different manners, including flexible zero control, to provide a permuted result. This family of instructions may be enabled using different opcodes or different immediate data to provide different permute functionality. For example, different encodings for each of the instructions (e.g., by way of opcode, immediate data or otherwise) can enable different and flexible zeroing behavior. As such, a lookup operation can be performed efficiently using combinations of such a single instruction to enable access of the designated value from, e.g., a lookup table stored in a register file. Embodiments may provide multiple flavors of these instructions to enable permute operations on one or more source packed values having different bit widths.

Embodiments thus may provide a family of vector instructions to perform permute operations. More specifically, a single user-level instruction can be used to permute adjacent data elements from one or more registers or memory based on packed runtime control and, further based on that control, selectively zero one or more elements of resulting data. By creating a family of small variants on this instruction type, software can issue sequences of such instructions to sieve data which can be composited to create a larger effective permute operation. For example, such compositions can be used for in-register parallel lookup. In this way, reduced overhead in performing a lookup to a table or other structure in memory can be realized.

FIG. 1 is a block diagram of an exemplary computer system formed with a processor that includes execution units to execute the permute instructions in accordance with an embodiment of the present invention. System 100 includes a component, such as a processor 102 to employ execution units including logic to perform algorithms for processing permute operations in accordance with the present invention, such as in the embodiments described herein. System 100 is representative of processing systems based on the PENTIUM® 4, PENTIUM® Dual-Core, Core™ 2 Duo and Quad, Xeon™, Itanium®, XScale™ and/or StrongARM™ microprocessors available from Intel Corporation of Santa Clara, Calif., although other systems (including PCs having other microprocessors, engineering workstations, set-top boxes and the like) may also be used. In one embodiment, system 100 may execute a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software. Alternative embodiments of the present invention can be used in other devices such as handheld devices and embedded applications.

Processor 102 includes one or more execution units 108 to perform an algorithm to perform permute operations on SIMD data elements in accordance with an embodiment of the present invention. System 100 is an example of a hub architecture. Processor 102 can be a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 102 is coupled to a processor bus 110 that can transmit data signals between the processor 102 and other components in the system 100.

In one embodiment, the processor 102 includes a Level 1 (L1) internal cache memory 104. Depending on the architecture, the processor 102 can have a single internal cache or multiple levels of internal cache. Alternatively, in another embodiment, the cache memory can reside external to the processor 102. Other embodiments can also include a combination of both internal and external caches depending on the particular implementation and needs. Register file 106 can store different types of data in various registers including integer registers, floating point registers, vector or extended registers, status registers, and an instruction pointer register.

Execution unit 108, including logic to perform integer and floating point operations, also resides in the processor 102. The processor 102 also includes a microcode (ucode) read only memory (ROM) that stores microcode for certain macroinstructions. For this embodiment, execution unit 108 includes logic to handle a packed instruction set 109. In one embodiment, the packed instruction set 109 includes various instances of permute instructions for efficiently handling such operations. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications can be accelerated and executed more efficiently by using the full width of a processor's data bus for performing those permute operations on packed data. This can eliminate the need to transfer smaller units of data across the processor's data bus to perform one or more operations one data element at a time.

Alternate embodiments of an execution unit 108 can also be used in micro controllers, embedded processors, graphics devices, digital signal processors (DSPs), and other types of logic circuits. System 100 includes a memory 120. Memory 120 can be a dynamic random access memory (DRAM) device, a static random access memory (SRAM) device, flash memory device, or other memory device. Memory 120 can store instructions and/or data represented by data signals that can be executed by the processor 102.

A system logic chip 116 is coupled to the processor bus 110 and memory 120. The system logic chip 116 in the illustrated embodiment is a memory controller hub (MCH). The processor 102 can communicate to the MCH 116 via a processor bus 110. The MCH 116 provides a high bandwidth memory path 118 to memory 120 for instruction and data storage and for storage of graphics commands, data and textures. The MCH 116 is to direct data signals between the processor 102, memory 120, and other components in the system 100 and to bridge the data signals between processor bus 110, memory 120, and a hub interface bus 122. In some embodiments, the system logic chip 116 can provide a graphics port for coupling to a graphics controller 112. The MCH 116 is coupled to memory 120 through a memory interface 118. The graphics card 112 is coupled to the MCH 116 through an Accelerated Graphics Port (AGP) interconnect 114.

System 100 uses hub interface bus 122 to couple the MCH 116 to the I/O controller hub (ICH) 130. The ICH 130 provides direct connections to some I/O devices via a local I/O bus. The local I/O bus is a high-speed I/O bus for connecting peripherals to the memory 120, chipset, and processor 102. Some examples are the audio controller, firmware hub (flash BIOS) 128, wireless transceiver 126, data storage 124, a legacy I/O controller containing user input and keyboard interfaces, a serial expansion port such as Universal Serial Bus (USB), and a network controller 134. The data storage device 124 can be a hard disk drive, a floppy disk drive, a CD-ROM device, a flash memory device, or other mass storage device.

While the scope of the present invention is not limited in this regard, permute instructions may be applied to different data widths. For example, one or more packed values of different bit widths may be obtained and its values may be permuted in accordance with one embodiment of the present invention. For example, 128-bit or 256-bit values may be obtained from an initial memory location or other source information corresponding to a source indicator. This vector data may have one or more lanes of data, each including multiple packed data elements. Within these vector data values, multiple packed data elements or fields may be present. For example, these individual data elements within the larger vector data element may take the form of bytes, words, double words (dword), or quad words (qword), although smaller and larger data elements are also possible. Furthermore, different data types may be used such as single and double precision integer and floating point data types. Thus, in some implementations packed single-precision (PS) values may be present, while other implementations may operate on packed double-precision (PD) values.

The term "registers" is used herein to refer to the on-board processor storage locations that are used as part of macro-instructions to identify operands. In other words, the registers referred to herein are those that are visible from the outside of the processor (from a programmer's perspective). However, the registers of an embodiment should not be limited in meaning to a particular type of circuit. Rather, a register of an embodiment need only be capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store 32-bit or 64-bit integer data. A register file of one embodiment also contains extended multimedia SIMD registers (e.g., XMM or YMM registers) for packed data. Such registers may include 128 bits wide XMM registers and 256 bits wide YMM registers (which may incorporate the XMM registers in their low order bits) relating to SSE2, SSE3, SSE4, GSSE, and beyond (referred to generically as "SSEx") technology to hold such packed data operands.

Generally, a data element is an individual piece of data that is stored in a single register or memory location with other data elements of the same length. In packed data sequences relating to SSEx technology, the number of data elements stored in a XMM (or YMM) register is 128-bits (or 256-bits) divided by the length in bits of an individual data element. As examples a 128-bit wide operand may include sixteen packed byte data elements. A byte is defined here as 8-bits of data. Information for each byte data element is stored in bit 7 through bit 0 for byte 0, bit 15 through bit 8 for byte 1, bit 23 through bit 16 for byte 2, and finally bit 120 through bit 127 for byte 15. Similarly, in packed data sequences relating to MMX and SSE technology, the number of data elements stored in an MMX register is 64-bits divided by the length in bits of an individual data element. A packed word vector can be 128-bits long and contain eight packed word data elements, with each packed word contains sixteen bits of information. A packed doubleword can be 128-bits long and contain four packed doubleword data elements, with each vector packed doubleword data element containing 32-bits of information. A packed quadword vector can be 128-bits long and contains two packed quad-word data elements. Of course, for 256-bit vectors, double the number of these data types may be present. It will be appreciated that such packed data formats may be further extended to other register lengths, for example, to 96-bits, 160-bits, 192-bits, 224-bits, 256-bits or more. Further, it is to be understood that various signed and unsigned packed data type representations may be stored in multimedia registers according to an embodiment of the present invention.

Figure 2:
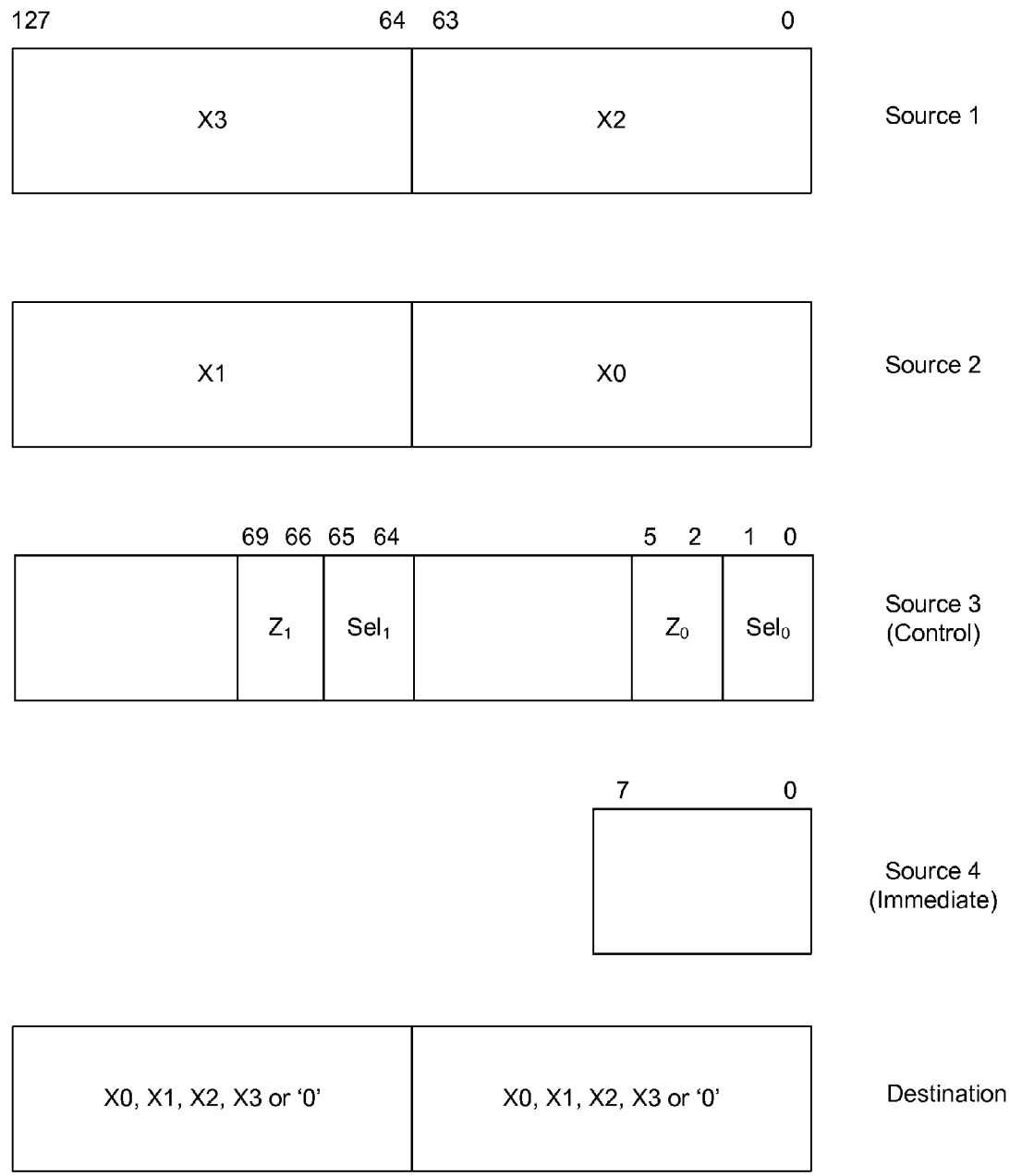
FIG. 2 is an example operand and control representation for use in accordance with one embodiment of the present invention.

For purposes of discussion, an example permute operation can be performed using two source operands, a control operand, and an immediate value to generate a result operand responsive to a single user-level permute instruction. Referring now to FIG. 2, shown are example operand and control representations for use in a single lane vector implementation in accordance with one embodiment of the present invention. Specifically, as shown in FIG. 2, two source operands may be identified in an instruction. As shown in FIG. 2, each source operand (Source 1 and Source 2) may be 128-bit values each having two 64-bit packed values. Source 1 and Source 2 thus each include two data elements, respectively data elements X2 and X3 in Source 1 and X0 and X1 in Source 2. In some implementations, Source 1 may be a given register, while Source 2 may be a register or memory location. While shown with this representation for ease of illustration in the embodiment of FIG. 2, understand that in different implementations wider operands may be used, including such operands having many more packed data elements, which may be of a smaller size than the 64-bit elements shown in FIG. 2.

Control of the permute operation may be based on information in control values, such as a control operand and immediate data. Specifically, as shown in FIG. 2 a third operand Source 3, which may be a vector control operand present at a given register or memory location, may include selection data and control data. Specifically in the embodiment of FIG. 2, bits 0:1 may be a selection field ($Sel_0$) that includes selection information to control selection of which packed data element of a given source is to be obtained for a given element of a destination operand. In turn, a zero control field (i.e., field $Z_0$ at bits 2:5 of the control operand) may be used to control a zeroing behavior for the given data element, in combination with at least a portion of the immediate data, shown in FIG. 2 as eight data bits. Similar control information is present in each element of the vector control operand (e.g., $Sel_1$ and $Z_1$ shown in FIG. 2).

Thus based on a given form of the user-level permute instruction and the information in the control operand and the immediate value, a selected one of data elements X0-X3 or a zero value may be written in a given element of the destination location which, in the embodiment of FIG. 2 may be a destination register. While shown with this particular implementation in the embodiment of FIG. 2, understand the scope of the present invention is not limited in this regard. For example, for a multi-lane vector, wherein each lane is the width shown in FIG. 2, after a first permute operation (as in FIG. 2), the operands may be incremented and a next lane processed accordingly.

Figure 3:
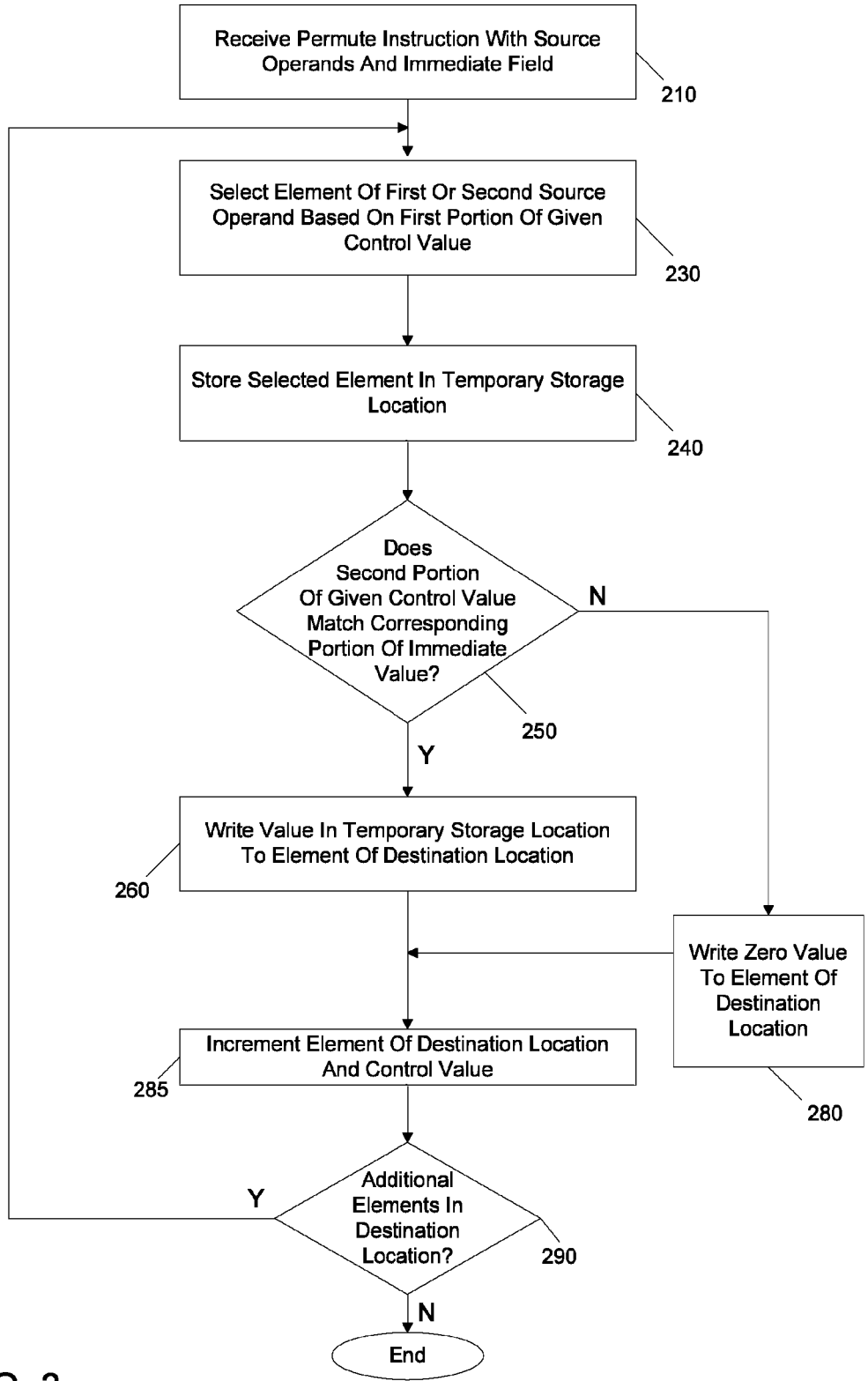
FIG. 3 is a flow diagram of a permute operation responsive to a user-level permute instruction in accordance with an embodiment of the present invention.

Using the operands and control values shown in FIG. 2, reference will now be made to FIG. 3, which is a flow diagram of a permute operation responsive to a user-level permute instruction in accordance with an embodiment of the present invention. As shown in FIG. 3, method 200 may begin by receiving a permute instruction with source operands and an immediate field (block 210). For example, a given core of a multicore processor may receive a user-level permute instruction that identifies one or more source operands and immediate data. For example, the instruction may identify two source operands from which data elements may be obtained, along with a third source operand (corresponding to a control operand) as well as immediate data of an immediate field of the instruction.

Referring still to FIG. 3, in a first pass through method 200 for a first element of a destination location, which may correspond to the lowest order element of the destination, based on a first portion of the control value (i.e., the selection information), an element of the first or second source operand may be selected (block 230). Different manners of selecting this element can occur in different embodiments. However, for purposes of discussion some portion of a given control value (the selection portion) may be analyzed and used to identify a corresponding portion of one of the source operands. This selected element may then be stored in a temporary storage location (block 240), such as a given register location.

Control then passes to diamond 250 where it may be determined whether a second portion of the given control value (i.e., the zero control element), which may correspond to another part of the control operand, matches a corresponding portion of the immediate value. While described as a match operation, different comparisons, hashes, or other operations may be performed between the control value portion and the immediate value portion to render this determination. Furthermore, in one implementation, only the immediate value may be analyzed.

If the determination results in a match, the value written to the temporary storage location may be written to the indicated element of the destination location (block 260). Otherwise, a zero value may be written to the corresponding element in the destination location (block 280). Then, the element of the destination location and the control value is incremented (block 285). Control then passes to diamond 290, where it may be determined whether additional elements are present in the destination location. If so, control passes back to block 230 where the method steps are performed again using a different control value. Otherwise the method concludes. In this way, a user-level instruction may provide for efficient permute operations, enabling flexible zero control based on the information in the control value and the immediate data. While shown with this particular implementation in the embodiment of FIG. 3, understand the scope of the present invention is not limited in this regard.

For example, for a multiple-lane vector after performing method 200 to obtain a result from a first lane of the vector, sources "jump up" (by 128 bits or some J bits). In one embodiment, the following pseudo code of Table 1 may handle control of a multi-lane permute operation, where the permute J operation may be generally in accordance with method 200 of FIG. 3.

TABLE 1

```
for (i=0; i<width/J; i++)              // for each lane
{
    permuteJ (dest, src1, src2, ctrl, imm, J)   // FIG. 3, steps 210-280
    dest += J                          // FIG. 3, step 285
    ctrl += J                          // FIG. 3, step 285
}
```

Table 2 illustrates pseudo code for an example permute operation of a user-level instruction in accordance with one embodiment of the present invention. A vector permute selects an element from many elements available in one or two sources (SRC1 and SRC2) using controls defined in low bits [N:0] of a control source (Control). The selected value is written to a temporary storage location such as a temporary register (TEMP). A corresponding element of the destination location (DESTINATION) is conditionally set to zero, unless the next higher bits [M:N+1] in the control source match a pattern determined in the immediate, in which case the temporary result is written to the destination element. This process is repeated for each element in the control and destination vector.

TABLE 2

```
For (each element 'I')
{
    TEMP := Permute (SRC1, SRC2, Control[I] bits [N:0])
    If (Match_zero(Control[I] bits [M:N+1], Immediate)
    {
        DESTINATION[I] := 0
    }
    Else DESTINATION[I]:=TEMP
}
```

Referring now to Table 3, shown is a pseudo code implementation of the selection of a source element via a permute operation for a single element of a destination location. Specifically, for the two-source operand permute shown in Table 3, based on a value of a given one or more of the control bits of the first portion of the control value (namely bits N:0), a selected element of one of the first and second source operands is returned, i.e., placed into the temporary storage (as shown in the pseudo code of Table 2). Thus this permute function acts to select a given element of one of the two source operands and place the result into a temporary storage responsive to a value of one or more bits of the control value. Of course, different control values can be used and based on different values for these portions, different elements of the source operands can be selected. Furthermore, a permute operation can act on more or fewer source operands to obtain a selected element based on control information.

TABLE 3

```
Permute (SRC1, SRC2, CONTROL)
{
    If (CONTROL bits [N-1:0] == 0)
        If CONTROL bit N == 0, return SRC1, Element 1 else return
        SRC2, Element 1
    If (CONTROL bits [N-1:0] == 1)
        If CONTROL bit N == 0, return SRC1, Element 2 else return
        SRC2, Element 2
```

TABLE 3-continued

```
For (x=2; x<=2^N −2; x++)
{
    If (CONTROL bits [N-1:0] == x)
        If CONTROL bit N == 0, return SRC1, Element (x+1) else return
        SRC2, Element (x+1)
}
    If (CONTROL bits [N-1:0] == 2^N−1)
        If CONTROL bit N == 0, return SRC1, Elemnt 2^N else return
        SRC2, Element 2^N
}
```

As described above, in different implementations, flexible zero control behavior also can be realized. One manner of effecting such flexible control is to provide comparison operations between a portion of the control value and the immediate data and based upon this result, cause a zero value to be written to a destination element. As described above, in some implementations a logical AND operation between the second portion of the control value and the immediate data can be performed and based on the result either a zero value or the identified source element is written to the destination element. However, the scope of the present invention is not limited in this regard and based on a given user-level instruction, different portions of a control value and immediate data can be compared or combined in different manners to provide the desired flexible zero control capability.

Referring now to Table 4, shown are example implementations of Boolean operations to provide such flexible zero control. In the embodiment shown in Table 4, multiple flavors of zero control capabilities are provided. Specifically, for each of the operations indicated if a TRUE value is returned, a zero value may be written to the corresponding destination element of the destination location. Otherwise, if the Boolean operation results in a FALSE result, then the identified source element (i.e., in accordance with the permute operation described above with regard to Table 3) can be stored in the selected destination element. While shown with these particular Boolean operations in the implementation of Table 4, understand the scope of the present invention is not limited in this regard.

TABLE 4

```
BOOL Match_zero(Z, IMM)
{
    If (IMM==0)
        Return TRUE;
    If (IMM = =1) AND (Z bit 0 == 0)
        Return TRUE;
    If (IMM = =2) AND (Z bit 0 == 1)
        Return TRUE;
    If (IMM = =3) AND (Z bits [1:0] == 0)
        Return TRUE;
    If (IMM = =4) AND (Z bits [1:0] == 1)
        Return TRUE;
    If (IMM = =5) AND (Z bits [1:0] == 2)
        Return TRUE;
    If (IMM = =6) AND (Z bits [1:0] == 3)
        Return TRUE;
    If (IMM = =7) AND (Z bits [2:0] == 0)
        Return TRUE;
    If (IMM = =8) AND (Z bits [2:0] == 1)
        Return TRUE;
    If (IMM = =9) AND (Z bits [2:0] == 2)
        Return TRUE;
    If (IMM = =10) AND (Z bits [2:0] == 3)
        Return TRUE;
    If (IMM = =11) AND (Z bits [2:0] == 4)
        Return TRUE;
    If (IMM = =12) AND (Z bits [2:0] == 5)
        Return TRUE;
```

TABLE 4-continued

```
    If (IMM = =13) AND (Z bits [2:0] == 6)
        Return TRUE;
    If (IMM = =14) AND (Z bits [2:0] == 7)
        Return TRUE;
    Return FALSE;
}
```

In various embodiments, the data/control elements may be bytes, words, dwords, qwords (or single/double floating-point elements).

Referring now to Table 5, shown is an example user-level permute instruction to perform permute operations on two-source double precision floating point values.

TABLE 5

| Instruction | Description |
|---|---|
| VPERMIL2PD xmm1, xmm2, xmm3/m 128, xmm4, imm8 | Permute double-precision floating-point values in xmm2 and xmm3/mem using controls from xmm4 and store result in xmm1 |

As shown in Table 5, for each double precision element in the destination operand (first operand XMM1), an element from four double-precision floating-point values is selected, two from the first source operand (second operand XMM2) and two from the second source operand (third operand XMM3/M128) obtained from a register or memory location using the selection sub-field in the low bits of each element of the third source operand (fourth operand XMM4). The destination may be zeroed if the corresponding control element's "Z" sub-field mismatches a value encoded in the immediate. Note that the 8-bit immediate encodes the third source register in bits [7:4] and an optional ZERO_MATCH in bits [1:0].

Table 6 shows an example of the fields present in an immediate byte, and Table 7 further shows an interpretation of the matching behavior encoded in the low order bits of the immediate byte.

TABLE 6

| 7 | 4 | 3 | 2 | 1 | 0 | bit |
|---|---|---|---|---|---|---|
| Third source register | | Ignored | | ZERO_MATCH | | |

TABLE 7

| ZERO_MATCH value | interpretation |
|---|---|
| 00b | No zeroing |
| 01b | No zeroing |
| 10b | Zero if src3 bit [i * 64 + 2] is 0 |
| 11b | Zero if src3 bit [i * 64 + 2] is 1 |

In this embodiment, there is a 3-bit control field in the third source operand XMM4 per destination double-precision element. Each control field is aligned with the low 3 bits of the corresponding double-precision destination element. The low 2 bits of the control field are used to select from the corresponding pairs in the first and second source operands. The third bit of the control field is used in combination with the ZERO_MATCH field to conditionally zero the output where i is the $i^{th}$ control element.

Table 8 shows pseudo code of 128-bit and 256-bit versions of the permute instructions, along with the primitive "select2dp", which is used to select a given element of one of the two source operands and the further primitive "sel_and_cond0dp", which incorporates both the selection of a given element according to the select primitive and testing for the conditional zeroing of a selected element.

TABLE 8

```
Operation
select2dp(src1, src2, sel)
{
    if (sel[1:0]=0) then TMP ← src1[63:0]
    if (sel[1:0]=1) then TMP ← src1[127:64]
    if (sel[1:0]=2) then TMP ← src2[63:0]
    if (sel[1:0]=3) then TMP ← src2[127:64]
    return TMP
}
sel_and_condzerodp(src1, src2, sel)
{
    TMP[63:0] ← select2dp(src1[127:0], src2[127:0], sel[1:0])
    IF (imm8[1:0] = 2) AND (sel[2]=0) THEN TMP[63:0] ← 0
    IF (imm8[1:0] = 3) AND (sel[2]=1) THEN TMP[63:0] ← 0
    return TMP
}
VPERMIL2PD (256-bit version)
DEST[63:0] ← sel_and_condzerodp(SRC1[127:0],
    SRC2[127:0], SRC3[2:0])
DEST[127:64] ← sel_and_condzerodp(SRC1[127:0],
    SRC2[127:0], SRC3[66:64])
DEST[191:128] ← sel_and_condzerodp(SRC1[255:128],
    SRC2[255:128], SRC3[130:128])
DEST[255:192] ← sel_and_condzerodp(SRC1[255:128],
    SRC2[255:128], SRC3[194:192])
VPERMIL2PD (128-bit version)
DEST[63:0] ← sel_and_condzerodp(SRC1[127:0],
    SRC2[127:0], SRC3[2:0])
DEST[127:64] ← sel_and_condzerodp(SRC1[127:0],
    SRC2[127:0], SRC3[66:64])
Dest[255:128] ← 0
```

Yet other flavors may be used to perform permute operations on single-precision floating point values. As shown in Table 9, another flavor of the instruction may be used to perform permute operations.

TABLE 9

| Instruction | Description |
|---|---|
| VPERM1L2PS xmm1, xmm2, xmm3/ m128, xmm4, imm8 | Permute single-precision floating-point values in xmm2 and xmm3/mem using controls from xmm4 and store result in xmm1 |

As shown in Table 9, for each single precision element in the destination operand (first operand XMM1), this instruction permutes 8 single-precision floating-point values, four from the first source operand (second operand XMM2) and four from the second source operand (third operand XMM3/M128) using 3-bit control fields in the low bytes of the third source operand (fourth operand XMM4). The destination may be zeroed if the fourth bit in the source control field matches a value encoded in the immediate. The immediate may encode an identification of the third source register and an optional ZERO_MATCH as described above in Table 6.

Figure 4:
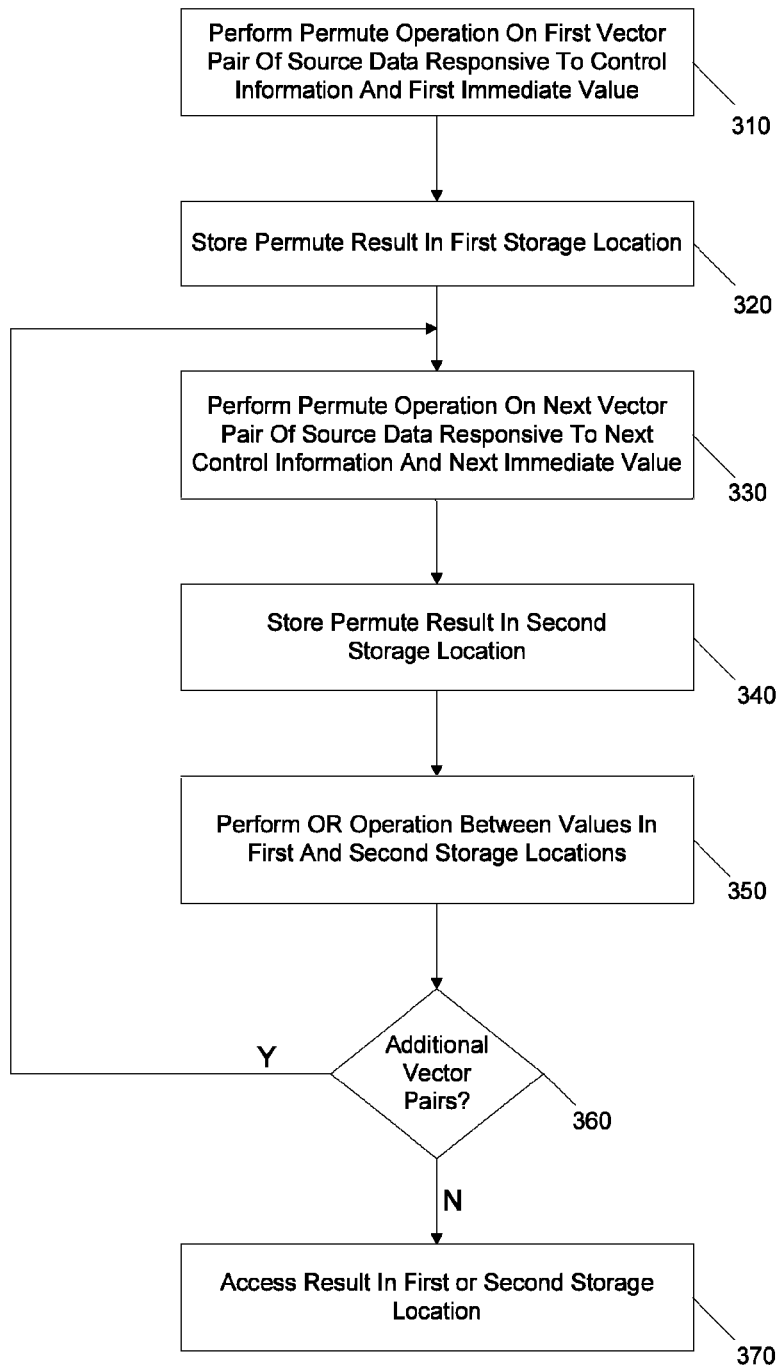
FIG. 4 is a flow diagram of a software composition of multiple permute instructions in accordance with one embodiment of the present invention.

To expand on the benefits of this family of instructions, software can be designed to compose multiple such instructions using different immediate controls in sequence. Referring now to FIG. 4, shown is a flow diagram of a method of compositing multiple permute instructions to enable efficient table lookup, without the need for loading of the entire table from memory into a cache or other temporary storage location. Instead, using a minimal amount of permute operations responsive to a small number of user-level permute instructions, a desired index value corresponding to a given element within the table (e.g., an addressable location) can be identified and obtained. As shown in FIG. 4, method 300 may begin by performing a permute operation on a first vector pair of source data responsive to control information and a first immediate value (block 310). This permute operation may be a first user-level instruction to write selected elements of the two vector sources (or zero values) into a first storage location (block 320).

Referring still to FIG. 4, another permute operation responsive to another user-level instruction may be performed on two additional pairs of vector source data (e.g., a next vector pair) and its results stored into another storage location (blocks 330 and 340).

Then to sieve data of these multiple permute results, a logical operation, e.g., a bitwise OR operation, may be performed between the values in these storage locations (block 350). Then it may be determined whether additional vector pairs are present (diamond 360). That is, depending on a given size of a table from which a lookup value is sought, additional vector pairs may be needed to be accessed are permuted. If so, control passes back to block 330, discussed above. Otherwise, the result, e.g., the lookup value, may be accessed in the first or second storage location (block 370). While shown with this particular implementation in the embodiment of FIG. 4, understand the scope of the present invention is not limited in this regard.

Example source code to perform such software composition is shown in Table 10, which is an instruction sequence that performs a data sieve. In this case, an 8-element, 3-source permute operation can be expanded into a 32-element (e.g., single precision) sieve used to perform a small table lookup. Such a lookup has applications in transcendental optimization, code book sources, among other applications.

TABLE 10

```
; source in data_source_1...data_source 8
; permute control in control
MOVAPS XMM0, data_source_1
MOVAPS XMM1, data_source_3
MOVAPS XMM2, data_source_5
MOVAPS XMM3, data_source_7
MOVAPS XMM4, control
PERMIL2PS XMM5, XMM0, data_source_2, XMM4, #1
PERMIL2PS XMM6, XMM1, data_source_4, XMM4, #2
ORPS XMM5, XMM6
PERMIL2PS XMM6, XMM2, data_source_6, XMM4, #3
ORPS XMM5, XMM6
PERMIL2PS XMM6, XMM3, data_source_8, XMM4, #4
ORPS XMM5, XMM6
; RESULT in XMM5
```

As shown in Table 10, the pseudo code may first move some number of the data sources, which may be part of lookup table stored in memory, from the memory to temporary storage locations. Thus as shown in Table 10, multiple move instructions, specifically move packed single precision value instructions (MOVAPS) may be executed to write some of the data sources to temporary storage locations, namely certain XMM registers. Furthermore, a control value which provides the permute control, both for selection of a given element of the source operands, as well as for use in performing Boolean operations with corresponding immediate values, may be written into another temporary storage location, namely another XMM register. In some embodiments, this control value may be generated dynamically, e.g., during an earlier portion of the transcendental operation, although in other embodiments it may be loaded from memory.

Table 10 continues on with multiple user-level permute instructions, namely multiple PERMIL2PS instructions, each of which is a two-source permute instruction to obtain a result value of these two single precision packed vector elements using the control and immediate values. Note that after the first two permute instructions are executed, an OR operation is performed (e.g., corresponding to the OR operation described above with regard to block 350 of FIG. 4). Finally, for the 32-element lookup table in the example of Table 11, the result may be stored in a given register, namely XMM5. The zeros selected by these immediates allow only one 'correct' nonzero element after the results are logically added ('OR'd), such that the resulting value includes only a single nonzero element, which is some embodiments may be a result of the table lookup.

Note that in the pseudo code of Table 10, the numbers (#1-#4) in each permute instruction refer to an immediate data, i.e., a predetermined control value for each instruction that determine the bits matched each field of 'control' when determining whether to 'zero' the destination element.

In this example, in-register operation dependencies on loads are avoided, as compared to existing lookup operations. Furthermore, note that the load operations, i.e., the MOVAPS instructions in the example of Table 10 can be hoisted out of loop. The number of operations is fundamentally smaller than a conventional lookup, with 7 basic operations (4 permutes and 3 'Ors'). Generally, the number of elements one can lookup depends on the size of the vector and the number of permutes strung together. For a vector of N elements and x permute instructions (that each access 2*N elements), the number of indexed elements is 2*X*N. As an example, suppose there are 4-wide vectors of single-precision elements. Each permute supports a lookup of eight elements. By stringing four of these together, a lookup of 4*8=32 elements can be realized. In contrast, a conventional lookup operation requires 2*vector width basic operations. As vector widths increase in advanced architectures, this operation becomes increasingly useful. In other embodiments, a merging form of the above instruction sequence may be provided, in which another source is added but the OR operations can be avoided.

Accordingly in various embodiments, a family of permutes with different zeroing behavior (where different bits or combinations of bits are examined) can be used and can be combined in selected compositions. The family is complimentary so that when used in sequence, a larger effective permute can be composed. As a result, an architecture can define a permute of fixed size, e.g., 8 elements, and software can compose them to create a larger effective permute, e.g., 16, 32, or 64 elements in size. Thus parallel "lookups" can be implemented with efficiency proportional to the vector width and limited only by register depth and implementation.

Embodiments thus provide improved performance for in-register lookups, such as for small tables used in transcendental processing and in custom floating-point software. As the vector width grows, i.e., as the architecture is applied to byte- and word-based elements, and as vector sizes increase in future architectures, sieving permutes become dramatically more efficient than any other lookup technique. Embodiments thus enable use of immediate contents to match against multiple patterns in control bits to enable flexible permutation operations. Using a software sequence of these instructions, table lookup can be efficiently performed. Further any encoding of immediate contents sequencing of a large number of permutes can be effective using a small number of bits of an immediate value.

Figure 5:
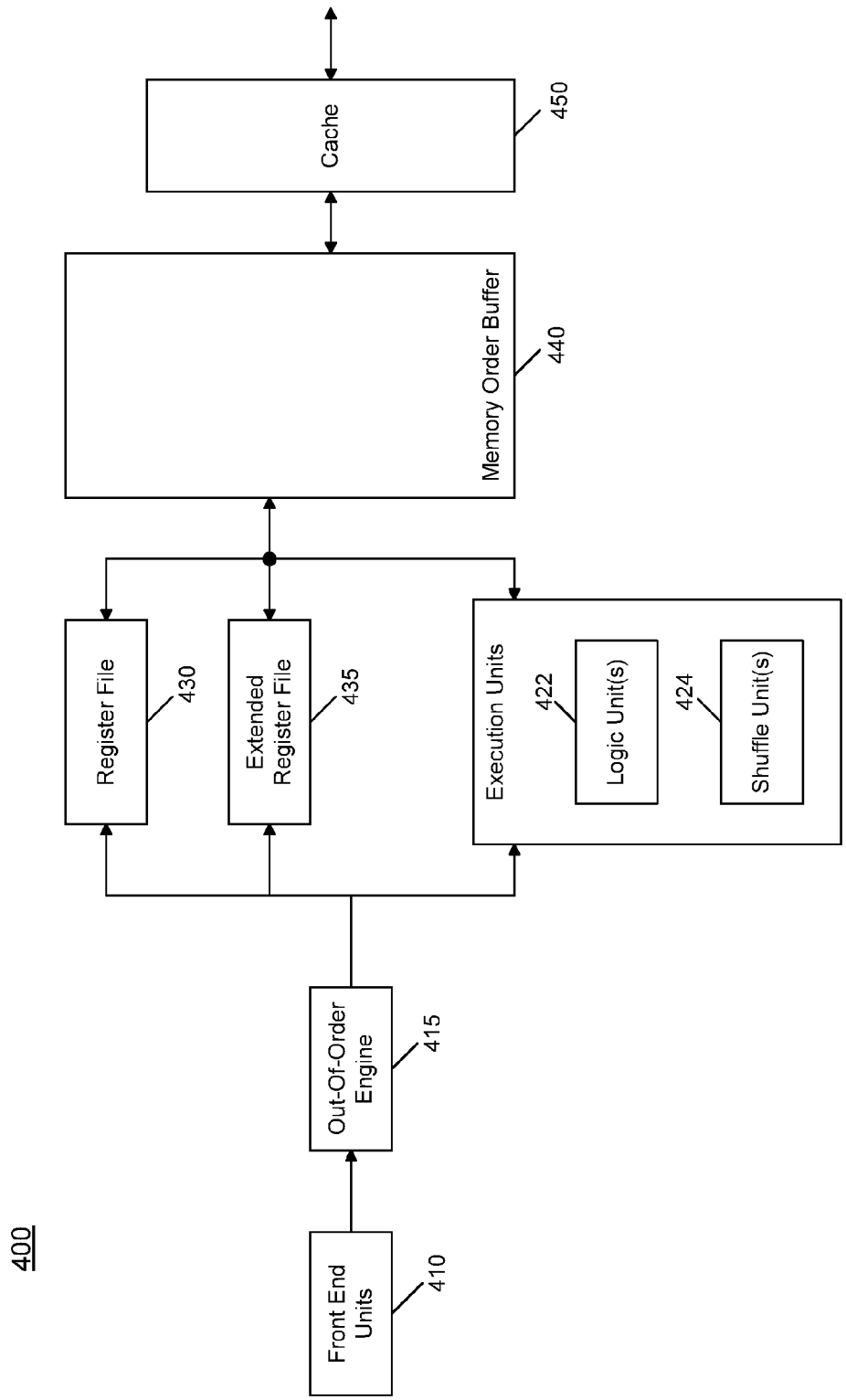
FIG. 5 is a block diagram of a processor in accordance with one embodiment of the present invention.

Referring now to FIG. 5, shown is a block diagram of a processor in accordance with one embodiment of the present invention. As shown in FIG. 5, processor 400 may be a multi-stage pipelined out-of-order processor. Processor 400 is shown with a relatively simplified view to illustrate various features used in connection with user-level permute instructions as described above.

As shown in FIG. 5, processor 400 includes front end units 410, which may be used to fetch macro-instructions to be executed and prepare them for use later in the processor. For example, front end unit 410 may include an instruction prefetcher, an instruction decoder, and a trace cache, along with micro-code storage as well as an μop storage. The instruction prefetcher may fetch macro-instructions from memory and feed them to instruction decoder to decode them into primitives, i.e., μops for execution by the processor. The trace cache may take decoded μops and assemble then into program ordered sequences for storage into the macro code storage. However, in the case of complex macro-instructions, the micro-code storage may provide the μops needed for the execution of the operation. Of course, additional components and features may be implemented in front end units 410.

Coupled between front end units 410 and execution units 420 is an out-of-order (OOO) engine 415 that may be used to receive the micro-instructions and prepare them for execution. More specifically OOO engine 415 may include various buffers to re-order micro-instruction flow and allocate various resources needed for execution, as well as to provide renaming of logical registers onto storage locations within various register files such as register file 430 and extended register file 435. Register file 430 may include separate register files for integer and floating point operations. Extended register file 435 may include extended registers such as XMM registers (e.g., 128-bit registers) and/or YMM registers (e.g., 256-bit registers), although in some implementations the XMM registers may be accommodated in the low order bits of the YMM registers.

Various resources may be present in execution units 420, including, for example, various integer, floating point, and SIMD logic units, among other specialized hardware. In the embodiment of FIG. 5, these execution units may include one or more logic units 422, such as arithmetic logic units (ALUs) which may perform logical operations such as logical OR operations on results of multiple permute instructions. The permute instructions may be performed using one or more shuffle units 424 which may include various hardware such as selectors, registers, and so forth to enable obtaining of source data and selecting portions or zero values for storage in a destination location.

After micro-instructions are executed in execution units 420, results may be provided to a memory sub-system of the processor, which includes a memory order buffer (MOB) 440 which may include control logic, load buffer, store buffer, and the like, and which is coupled to a cache memory 450, which in turn communicates out of the core.

Figure 6:
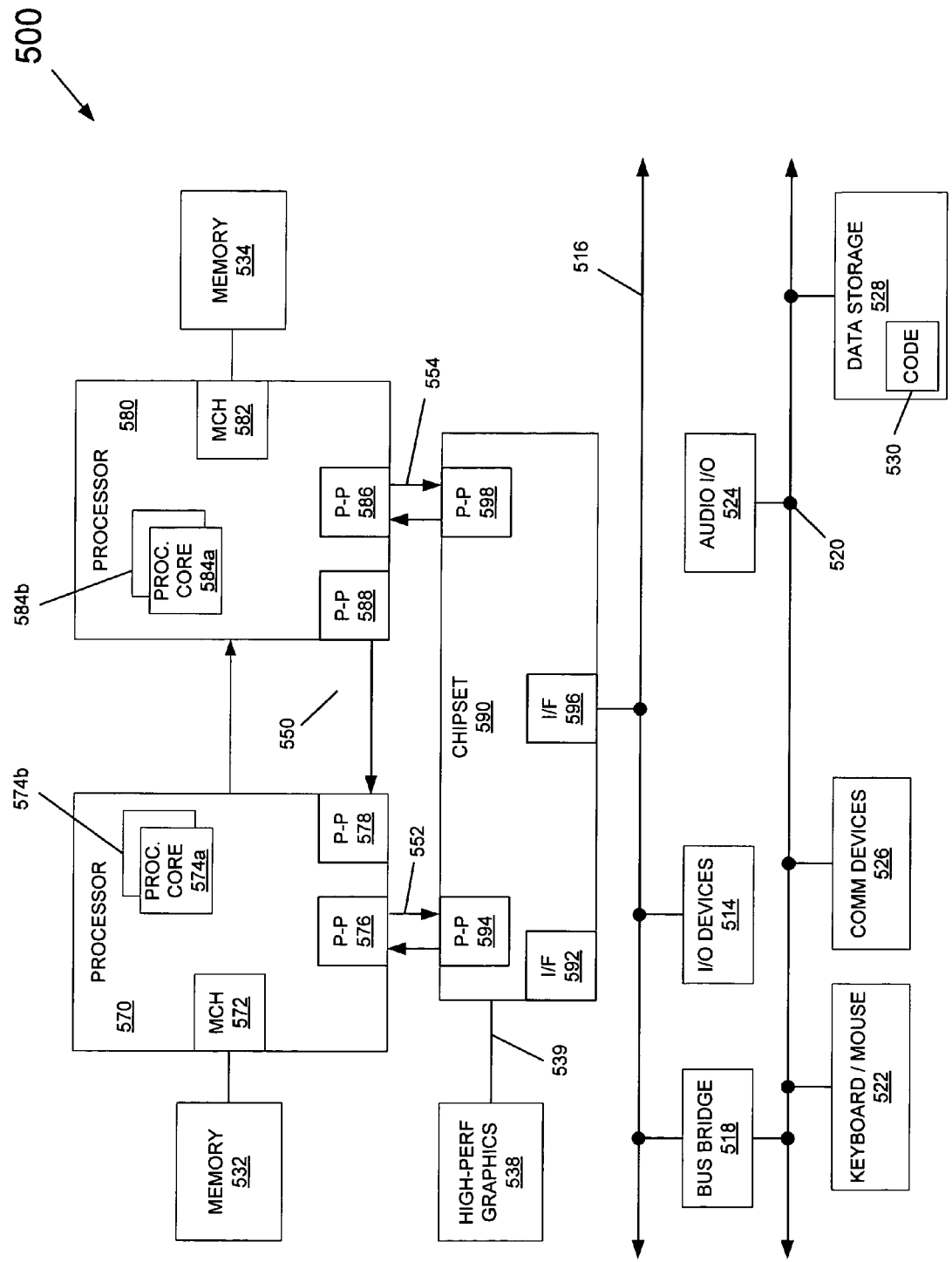
FIG. 6 is a block diagram of a system in accordance with one embodiment of the present invention.

Embodiments may be implemented in many different system types. Referring now to FIG. 6, shown is a block diagram of a system in accordance with an embodiment of the present invention. As shown in FIG. 6, multiprocessor system 500 is a point-to-point interconnect system, and includes a first processor 570 and a second processor 580 coupled via a point-to-point interconnect 550. As shown in FIG. 6, each of processors 570 and 580 may be multicore processors, including first and second processor cores (i.e., processor cores 574a and 574b and processor cores 584a and 584b). Each processor core may include logic such as shown in FIG. 5 to enable execution of single instruction permute operations in accordance with an embodiment of the present invention. In this way, efficient in-register table lookups can be performed.

Still referring to FIG. 6, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 4, MCH's 572 and 582 couple the processors to respective memories, namely a memory 532 and a memory 534, which may be portions of main memory (e.g., a dynamic random access memory (DRAM)) locally attached to the respective processors. First processor 570 and second processor 580 may be coupled to a chipset 590 via P-P interconnects 552 and 554, respectively. As shown in FIG. 6, chipset 590 includes P-P interfaces 594 and 598.

Furthermore, chipset 590 includes an interface 592 to couple chipset 590 with a high performance graphics engine 538. In turn, chipset 590 may be coupled to a first bus 516 via an interface 596. As shown in FIG. 6, various I/O devices 514 may be coupled to first bus 516, along with a bus bridge 518 which couples first bus 516 to a second bus 520. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
   a cache memory; and
   logic to:
      receive a permute instruction and, included with the permute instruction, first and second source operands, a first control value, and a second control value, the first and second control values separate from the first and second source operands, the logic to perform a permute operation responsive thereto, wherein the logic is to select a portion of the first source operand or the second source operand directly based on a value of a second portion of the first control value; and
      store the selected portion of the first or second source operand or a zero value in a destination location based on whether a first portion of the first control value matches at least a portion of the second control value.

2. The processor of claim 1, wherein the logic is to store the selected portion or the zero value for each of a plurality of elements of the destination location.

3. The processor of claim 2, wherein the logic is to perform the permute operation on multiple lanes of vector data responsive to the permute instruction.

4. The processor of claim 2, wherein a result of the destination location is a lookup result of a table stored in memory.

5. The processor of claim 1, wherein the logic is to store the selected portion into a temporary storage location and to thereafter store the selected portion in the destination location.

6. The processor of claim 5, wherein determination of the match comprises a Boolean operation.

7. The processor of claim 1, further comprising second logic to combine a result of the permute instruction with a result of a second permute instruction and to store the combined result in a second destination location.

8. The processor of claim 7, wherein the logic is to perform a permute operation using the combined result and a third source operand.

9. A non-transitory machine-readable medium having stored thereon instructions, which when executed by a machine causes the machine to perform a method comprising:
performing a pair of permute operations each responsive to a user-level permute instruction to obtain a first and second permuted result, wherein performing a first one of the pair of permute operations comprises receiving, included with the user-level permute instruction, first and second source operands, a control operand, and an immediate value, the control operand and the immediate value separate from the first and second source operands, selecting a portion of the first source operand or the second source operand directly based on a value of a second portion of the control operand, and storing the selected portion or a zero value in a destination location based on a comparison between a first portion of the control operand and at least a portion of the immediate value;
logically combining the first and second permuted results to obtain a first combined result;
performing at least one other permute operation responsive to a user-level permute instruction to obtain a third permuted result;
logically combining the first combined result and the third permuted result to obtain a final result.

10. The machine-readable medium of claim 9, wherein the final result corresponds to a lookup result from a table in memory.

11. The machine-readable medium of claim 9, wherein the method further comprises storing the selected portion into a temporary storage location and thereafter storing the selected portion in the destination location based on a result of the comparison.

12. A method comprising:
performing a data sieve using a plurality of user-level permute instructions that execute using registers of a register file of a processor, to obtain a lookup result from a table stored in a storage coupled to the processor, wherein each user-level permute instruction is to cause the processor to select a portion of a first or second source operand included with the user-level permute instruction directly based on a second portion of a first control value and to store the selected portion or a zero value in a destination location based on a comparison between a first portion of the first control value and at least a portion of immediate data, both of which are included with the user-level permute instruction and separate from the first and second source operands.

13. The method of claim 12, further comprising selecting the selected portion of the first source operand or the second source operand based on the second portion of the first control value, storing the selected portion of the first source operand or the second source operand into a temporary storage location, and thereafter storing the selected portion of the first source operand or the second source operand in the destination location based on a result of the comparison.

14. The method of claim 12, further comprising logically combining first and second permuted results of first and second user-level permute instructions to obtain a first combined result, and logically combining the first combined result and a third permuted result of a third user-level permute instruction to obtain the lookup result.

15. A system comprising:
a processor including first logic to generate a permuted result including a selected portion of a first or second source operand or a zero value for each element of a destination location responsive to a first permute instruction of a family of permute instructions, based on a comparison between a first portion of a first control value and a second control value included with the first permute instruction, the first and second control values separate from the first and second source operands, wherein the selected portion is selected based directly on a second portion of the first control value, and second logic to combine the permuted result and a second permuted result of a second permute instruction of the family of permute instructions and to store the combined result in a second destination location; and
a dynamic random access memory (DRAM) coupled to the processor.

16. The system of claim 15, wherein the first logic is to select the selected portion of the first source operand or the second source operand, store the selected portion of the first source operand or the second source operand into a temporary storage location, and thereafter store the selected portion of the first source operand or the second source operand in the corresponding element of the destination location if the comparison results in a first value.

17. The system of claim 16, wherein the first logic is to store the zero value in the corresponding element of the destination location if the comparison results in a second value.

18. The system of claim 16, wherein the processor is to receive a plurality of permute instructions, each having first and second control values, and to perform an in-register lookup to a table stored in the DRAM.

19. The system of claim 18, wherein the second logic is to combine results of the plurality of permute instructions to generate a lookup result corresponding to an element from the table.

20. The system of claim 15, wherein different permute instructions of the family of permute instructions include different encodings to enable different zeroing behavior.

21. The system of claim 20, wherein the different encodings include different immediate data values, wherein each of the immediate data values includes a second control value.

* * * * *